Sept. 1, 1970  J. P. NORTON  3,526,270

CONDENSER PRESSURE CONTROL MEANS AND METHOD

Filed Nov. 8, 1966  2 Sheets-Sheet 1

INVENTOR.
John P. Norton
BY *Edward M. Stautermann*

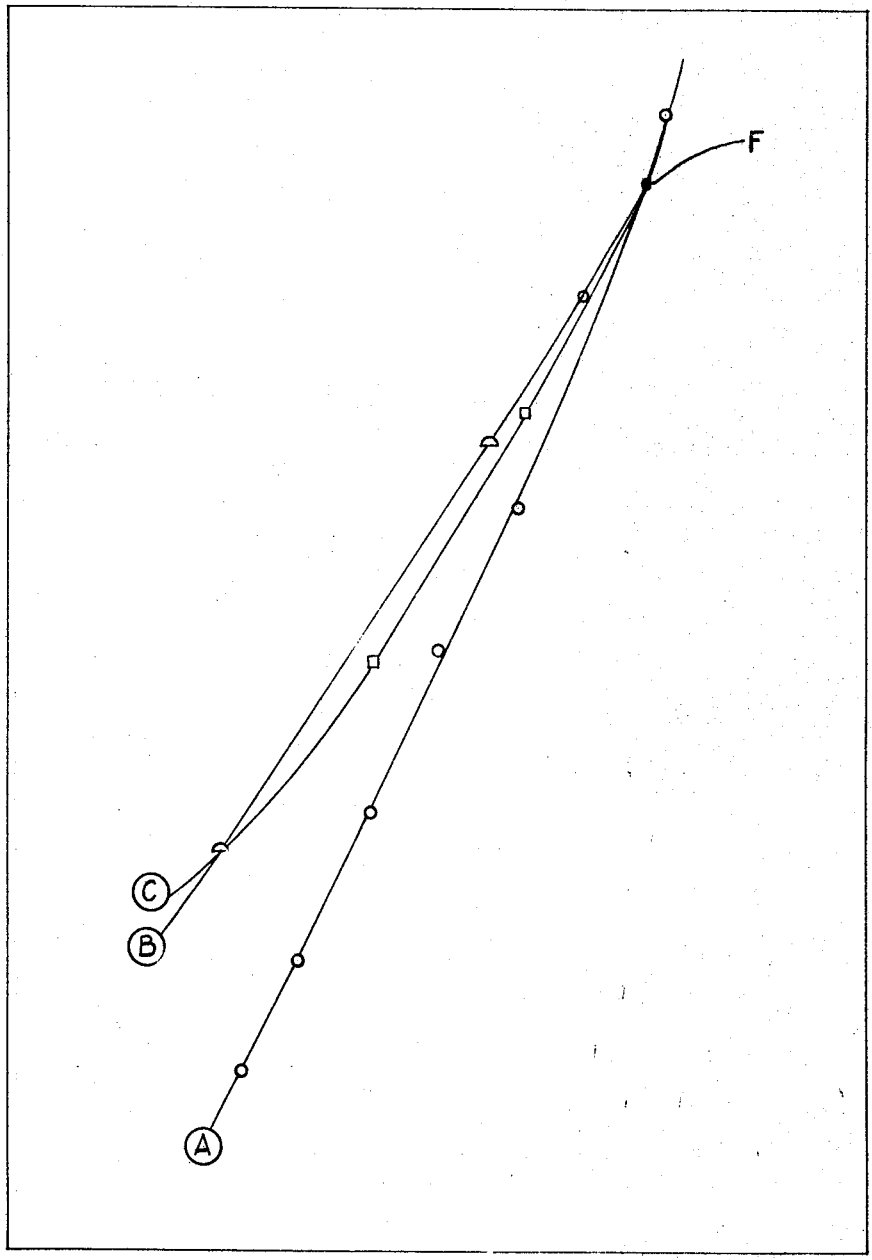

United States Patent Office 3,526,270
Patented Sept. 1, 1970

3,526,270
CONDENSER PRESSURE CONTROL MEANS AND METHOD
John P. Norton, St. Louis, Mo., assignor to American Air Filter Company, Inc., Louisville, Ky., a corporation of Delaware
Filed Nov. 8, 1966, Ser. No. 592,914
Int. Cl. F25b 13/00
U.S. Cl. 165—2                              9 Claims

ABSTRACT OF THE DISCLOSURE

The present invention relates to heat exchange circuits where an expandable-condensable working fluid is circulated through a closed heat exchange fluid flow circuit which includes means to vaporize the fluid and condenser means to condense a portion of the vaporized working fluid, and, more particularly, relates to method and apparatus for advantageously and selectively distributing a noncondensable gas through said circuits in response to the condition of the circulating working fluid to regulate the operation and control the pressure within such circuits.

---

In a closed circulating fluid, heat exchange circuit, for example a refrigeration circuit, where a vaporizable-condensable working fluid is circulated through the closed circuit and heat is removed from the working fluid in a cooperative condenser, the pressure in the circuit is affected by the vapor pressure of the fluid and, therefore, is a function of the temperature of the working fluid. Many common working fluids, for example refrigerants circulated in refrigeration circuits, have subatmospheric vapor pressures at low temperatures and if a portion of the circuits, for example the condensers, are exposed to ambient air at such extremely low temperatures, subatmospheric pressure can occur within at least a part of the refrigeration circuit. Subatmospheric pressures are undesirable, particularly in nonoperating refrigeration circuits, because subatmospheric pressure promotes introduction of air into the circuit through loose fitting, inactive rotary seals or leaks in various other elements of the circuit. In such circuits even a very small air leak is undesirable because the oxygen and water vapor carried by the air lead to degradation of the refrigerant, or the working fluid, and the products of degradation promote corrosion of the equipment. Furthermore, noncondensable gases which are drawn into the circuit under subatmospheric pressure adversely affect the operation of the circuit and, furthermore, previous circuits have not provided means to accommodate gases, such as air, which are noncondensable relative to the working fluid. Moreover, in previous circuits, particularly refrigeration circuits, it has been necessary to purge such noncondensable gases with a resulting loss of valuable working fluid. In addition, noncondensable gases which have leaked into previous working fluid circulating circuits, such as refrigeration circuits, collect in the working fluid condensing means with resulting loss of working fluid condensing area and condenser effectivity.

To prevent the inleakage of air, and minimize other adverse effects of subatmospheric pressure in refrigeration circuits, it has been necessary to include both pressure and vacuum seals for the rotary elements of the apparatus used to pump or compress working fluid. The pressure seals have been necessary to prevent loss of working fluid when the circuit is in operation under pressure and vacuum seals are necessary to reduce inleakage of air when the circuit is operating, or is idle, and the refrigerant pressure is subatmospheric in at least a part of the circuit. Such double seal arrangements are complicated, expensive, require considerable maintenance and are only moderately successful.

Various methods have been used to maintain the pressure of the working fluid within selected limits during operation of refrigeration circuits. Such methods have generally been directed to maintaining the temperature and pressure of the refrigerant and have included complicated, expensive, means to regulate the effective condensing area of the condensers to control heat lost by the working fluid in accordance with the condition of the refrigerant. Such methods have been moderately successful in controlling the working fluid pressure when the circuits are operating but have no effect when the circuits are not operating.

Additionally, operation of previous refrigeration circuit condensers at low temperature has undesirably decreased the refrigerant pressure at the condenser outlet to decrease the flow rate of the refrigerant supplied to the expansion device and reduce the cooling capacity of the refrigeration circuit.

In accordance with the present invention a novel, straightforward method and apparatus is provided to provide a selected minimum pressure at low temperature within a flow circuit including means for circulating a vaporizable-compressible working fluid and means to alternately vaporize and condense the working fluid. In accordance with the present invention it is recognized that the reliable method and inexpensive apparatus provides means to advantageously distribute noncondensable gases through such a circuit to simultaneosuly control the pressure and operating characteristics of the circuit and that operating reliability of the circuit is improved because the novel arrangement in accordance with the present invention requires no moving parts.

Moreover, in accordance with the present invention it has been recognized that the advantageous method and apparatus provides means to simultaneously regulate the circuit pressure and the effective condensing area of the condenser when the circuit is operating and assure a minimum pressure when the circuit is not in operation.

It has been further recognized that the advantageous method and apparatus can likewise be adapted for use in a portable heater wherein a heated partially vaporized working fluid is circulated through condenser means to heat a stream of air passing through the condenser and condense a part of the working fluid. The method and apparatus in accordance with the present invention improves the operating characteristics of such circuits and assures above-atmospheric pressure within the circuits at all times, even when the circuits are not operating and are exposed to ambient air of very low temperatures.

Various other features of the present invention will become obvious to those skilled in the art upon reading the disclosure set forth hereinafter.

More particularly, in an arrangement where a vaporizable-condensable working fluid is circulated through a cooperatively interconnected circuit including pump means to pump the fluid, means to vaporize the fluid, and condenser means to condense a portion of the fluid, the present invention provides a method for controlling operation of the circuit including: introducing a noncondensable gas into the circuit in response to decrease in vapor pressure of the working fluid circulated through the circuit so the total gas pressure of the circuit is in excess of the vapor pressure of the working fluid; and, removing a portion of the noncondensable gas from the circuit in response to an increase in vapor pressure of the working fluid.

In accordance with the present invention a novel interconnected fluid flow circuit also is provided including: pump means to circulate vaporizable-compressible working fluid through the circuit; condenser means to receive working fluid to condense a vaporized portion of such working fluid; gas supply means to supply noncondensable gas having a vapor pressure substantially greater than the vapor pressure of the working fluid; means to cooperatively, communicatively, connect the gas supply means into the circuit so the noncondensable gas is supplied to the circuit in response to decreased vapor pressure of the working fluid to increase the total pressure of the circuit; means to remove noncondensable gas from the circuit in response to increase in equilibrium pressure of the working fluid to return the noncondensable gas to the gas supply means; and, means to pass a fluid to be heated through the condenser means in heat exchange relation with cooling medium to remove heat from the vaporizable-condensable working fluid.

It will be realized by those skilled in the art that various changes can be made in the arrangement, form, or configuration of the apparatus and method disclosed herein without departing from the scope or spirit of the present invention.

Referring now to the drawings.

Figure 1:
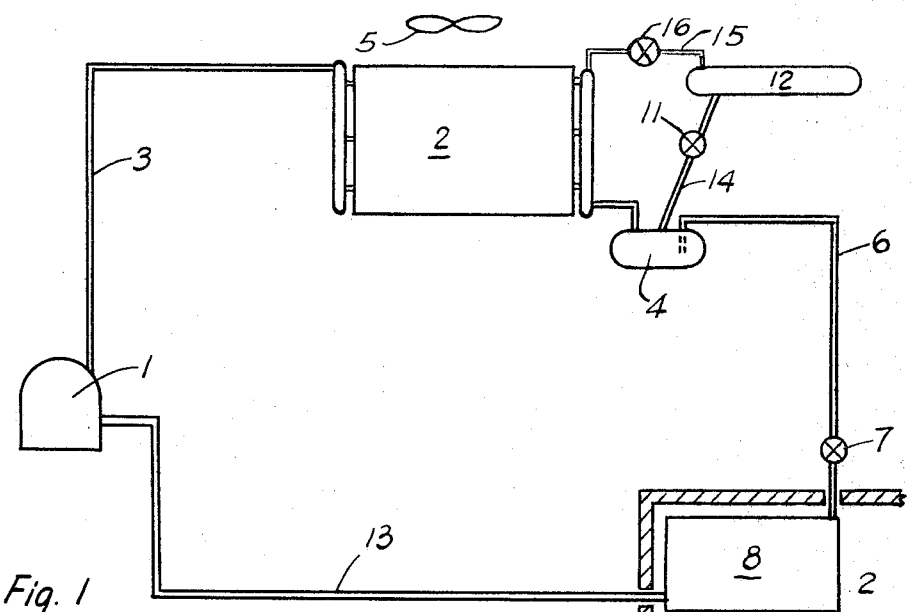
FIG. 1 is a schematic representation of a refrigeration circuit including a control arrangement in accordance with the present invention.

FIG. 1 is an illustration of a novel refrigeration circuit including a pump or compressor 1 connected to a refrigerant condenser 2 by means of conduit 3. A fan means 5 can be provided to supply cooling medium, for example air, to condenser 2 and a receiver 4 can be provided to receive compressed, cooled, refrigerant emitted from condenser 2. Compressed, cooled refrigerant can be supplied through conduit 6 to an expansion device 7, for example a thermostatic expansion valve. Expanded refrigerant emitted from expansion valve 7 is supplied to evaporator 8 to provide cooling effect to space 9 to be conditioned, and the expanded refrigerant is returned to compressor 1 by means of conduit 13.

As shown in the example of FIG. 1, a noncondensable gas storage chamber 12, in accordance with the present invention, is provided and can be connected to the top, or gas holding portion, of receiver 4 by means of conduit 14. Conduit 14 can include a valve 11 to regulate flow of gas from chamber 12 to receiver 4 and valve 11 can be completely closed to prevent the flow of gas from chamber 12 to receiver 4, particularly when gas is being charged to chamber 12.

Chamber 12 is advantageously disposed, in relation to condenser 2, so that the noncondensable gas migrates to chamber 12 upon an increase in the temperature of the working fluid accompanied by a corresponding increase in the vapor pressure of the working fluid. Furthermore, chamber 12 can advantageously be disposed so working fluid or refrigerant which condenses in chamber 12 is returned to the refrigeration circuit by gravity flow.

As shown in the example of FIG. 1 the desired effect can be achieved, for example, by attaching a single pipe connection 14 from chamber 12 to the top section of refrigerant receiver 4. Also, a second connection, for example conduit 15 including a valve 16, can be provided to connect the top of condenser 2 with chamber 12 to provide an escape for noncondensable gas which can collect adjacent the top of condenser 2. An alternative embodiment (not shown) which can, for example, be used in refrigeration systems where the receiver has limited capacity or is frequently removed from the circuit includes a noncondensable gas storage chamber disposed above the condenser and connected to the top of the condenser so refrigerant migrating to the gas storage vessel is condensed to flow by gravity through a conduit to the condenser while the noncondensable gas is removed directly from the top of the condenser.

In operation of the example of a refrigeration circuit in accordance with the present invention, as shown in FIG. 1, storage chamber 12 can be adapted to be charged with a selected gas having a pressure above atmospheric and substantially greater than the partial pressure of the working fluid so that practically all of the selected gas remains in the gaseous phase to provide a superatmospheric pressure when a substantial amount of the working fluid has condensed to the liquid phase at low temperature. The selected gas which has a relative volatility substantially greater than the relative volatility of the refrigerant and can be considered relatively noncondensable, for example dry nitrogen, is charged to chamber 12 from a high pressure source, above atmospheric pressure (not shown), and valve 11 which can be a manual valve and is normally open during operation can be closed during the charging operation so that the quantity of gas charged to chamber 12 can be easily computed in accordance with the volume of chamber 12 and the pressure and temperature of the gas in chamber 12. The quantity of gas charged to chamber 12 can be selected to provide a selected effect and can, for example, be the quantity necessary to provide a selected pressure in the circuit at a selected minimum temperature. The quantity would therefore be computed in accordance with the volume of the circuit and the volume of the liquified working fluid at the selected temperature. After chamber 12 has been charged valve 11 is moved to normally open position so gas flows to receiver 4 to mix with the refrigerant vapor in receiver 4 and condenser 2 where the vapor pressure exerted by the refrigerant is less than the pressure originally exerted by the noncondensable gas charged to chamber 12.

When the circuit is not operating, the relatively noncondensable gas from chamber 12 maintains the pressure in the system in accordance with the temperature of the gas, the equilibrium pressure of the working fluid liquid and the volume occupied by the liquified working fluid.

When the circuit is in operation the refrigerant emitted from compressor tends to concentrate the noncondensable gas in the area of condenser 2, receiver 4 and chamber 12. Noncondensable gas tends to be swept from the condenser by the refrigerant emitted from compressor 1 and the quantity of noncondensable gas retained in condenser 2, is directly affected by the volume occupied by the refrigerant and the flow rate of refrigerant through condenser 2. A bleed line 15 can be provided to connect the top of condenser 2 with chamber 12 to remove the noncondensable gas which collects at the top of condenser 2 and which is not swept from condenser 2 by refrigerant emitted from compressor 1. Bleed line 15 can include a normally open valve 16 to be closed as desired to prevent flow through conduit 15. It will be noted that in the example of the refrigeration apparatus of FIG. 1 the noncondensable gas will not normally flow from receiver 4 through evaporator 8 to the inlet of compressor 1 so long as there is liquid refrigerant in receiver 4.

In operation when the pressure in condenser 2 is in excess of the pressure necessary to force all of the noncondensable gas into chamber 12, the quantity of noncondensable gas in receiver 4 or condenser 2 is negligible. In accordance with the present invention it has been recognized that when the refrigerant pressure at the discharge of the condenser 2 decreases, in response to decreased refrigerant vapor pressure, noncondensable gas flows from chamber 12 to receiver 4 and into condenser 2 to reduce the effective condensing surface of the condenser. The migration of noncondensable gas to condenser 2 decreases the condensing area and therefore, decreases the rate of condensation of refrigerant in condenser 2 and can increase the temperature and vapor pressure of refrigerant emitted from condenser 2. It has been recognized that the increased pressure in receiver 4 and condenser 2 resulting from the introduction of noncondensable gas in accordance with the present invention advantageously increases the discharge pressure of compressor 1 to stabilize the operation of compressor 1.

It will be noted that by proper selection of the relatively noncondensable gas charged to chamber 12 and the volume of chamber 12 the present invention provides a straightforward, reliable means to control the discharge pressure of the compressor by directly controlling the pressure within the circuit and simultaneously decreasing the effective condensing area of condenser 2. The decreased the heat loss experienced by the refrigerant in the condenser resulting in an increase in the temperature and vapor pressure of the working fluid.

In the operation of one example of an apparatus in accordance with the present invention, as shown in FIG. 1, the volume of chamber 12 was approximately 1.5 times as great as the volume of the entire circuit not occupied by liquified refrigerant. FIG. 3 illustrates data from an actual comparison of the operation of such a refrigeration circuit, in one case using the method and apparatus of the present invention and, in another case, the operation of the same refrigeration circuit without the advantageous method and apparatus provided by the present invention. Referring to FIG. 3 the discharge pressure of the compressor, for example compressor 1 of FIG. 1, is shown on the vertical axis and the temperature of the air entering the condenser; for example condenser 2 of FIG. 1, is shown on the horizontal axis. Curve A represents the change in discharge pressure with change in entering air temperature as experienced in operation of the circuit without the advantageous method and apparatus in accordance with the present invention. Curves B and C shows the change in discharge pressure with change in condenser air temperature experienced when the refrigeration circuit is operated in accordance with the method of the present invention and the slope of lines B and C relative to the slope of line A illustrates the effect of operation in accordance with the method of the present invention.

Specifically, Curve B represents the variation in discharge pressure experienced in the operation of a refrigeration circuit in accordance with the present invention as the temperature of the air supplied to condenser 2 is *decreased*. A decrease in the temperature of air supplied to the condenser decreases the temperature of the refrigerant andtherefore the refrigerant vapor pressure with a resulting decrease in compressor discharge pressure. Considering Curves A and B of FIG. 3 it is clear that the introduction of a controlled quantity of noncondensable gas to the circuit in response to decreased working fluid vapor pressure advantageously provides increased compressor discharge pressure.

Curve C represents the variation in compressor discharge pressure experienced in the operation of a refrigeration circuit in accordance with the present invention as the temperature of the air supplied to the condenser 2 is *increased*. An increase in the temperature of the air supplied to the condenser increases the temperature of the working fluid and the vapor pressure of the refrigerant. It will be noted that Curve C of FIG. 3 approaches Curve A indicating the removal of the relatively noncondensable gas from the system in response to increasing temperature of the air supplied to condenser 2. At point F Curves A and C cross indicating elimination of all noncondensable gas from the system.

The performance curves show that introduction of a relatively noncondensable gas into the circuit, in accordance with the method of the present invention, desirably provides an increase compressor discharge pressure when the temperature of the cooling medium supplied to the condenser is low and does not adversely affect the operation of the circuit when the temperature of the cooling medium supplied to the condenser is increased so the equilibrium pressure of the refrigerant emitted from the condenser is equal to pressure of the noncondensable gas as originally charged to chamber 12. It is to be noted that when the equilibrium pressure of the refrigerant is equal to the pressure of the relatively noncondensable gas as charged to chamber 12, point F of FIG. 3, all of the noncondensable gas has been collected in chamber 12 and the circuit operation is unaffected by the presence of the noncondensable gas in chamber 12.

Figure 2:
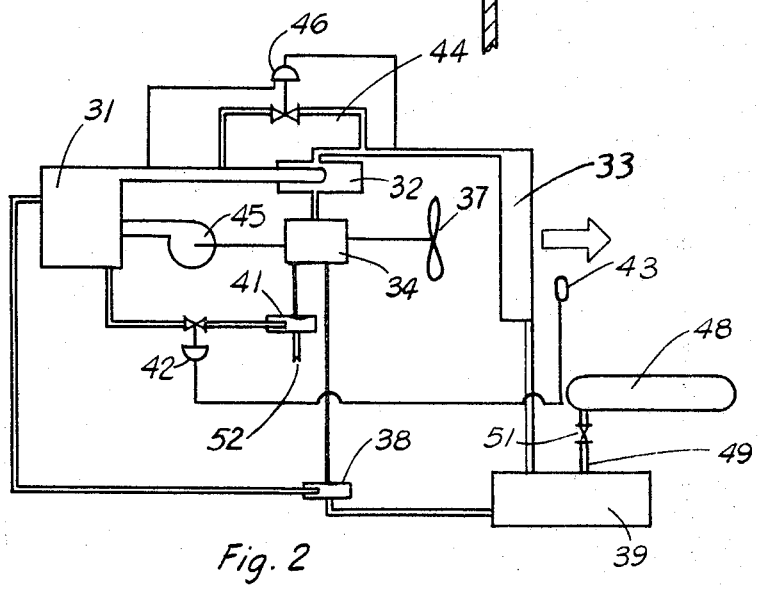
FIG. 2 is a schematic representation of a portable heater arrangement including a control arrangement in accordance with the present invention; and, FIG. 3 is a diagram illustrating the effect of a control arrangement in accordance with the present invention.

As stated hereinbefore, the method and apparatus in accordance with the present invention can be adapted for use in fluid heating circuits where an expandable-condensable fluid is at least partially vaporized to be circulated through a working fluid condenser means to heat a stream of fluid passed through the condenser in heat exchange relation. FIG. 2 is one example of such an application in accordance with the present invention where the operation of a portable heater, to heat a stream of air, is improved by providing a selected noncondensable gas on the circuit and regulating the distribution of such noncondensable gas by means in accordance with the present invention.

The heater of FIG. 2, which in many respects is similar to that disclosed in assignee's application Ser. No. 516,641 filed Dec. 27, 1965, applicant John P. Norton includes a working fluid generator 31 to provide a vaporized working fluid which can be used to provide power to auxiliary components of the heater and to heat the stream of air to be heated by the heater.

In the example of the heater shown in FIG. 2, engine 32 receives vaporized motive fluid from generator 31 and transforms a portion of the pressure energy of the motive fluid to rotary motion to drive power transmitting means 34. Reduced pressure motive fluid is exhausted from turbine 32 to condenser 33 and a portion of the vaporized motive fluid from generator 31 is bypassed around engine 32 through bypass 44 to maintain a constant differential pressure across engine 32. Means, for example pressure responsive valve 46, can be provided to control the differential across engine 32 and the pressure at the outlet of generator 31. The working fluid bypassed around engine 32 and the fluid passed through engine 32 are recombined to flow to condenser 33 to impart heat to the fluid passed through the condenser in heat exchange relation. Motive fluid exhausted from condenser 33 passes to receiver 39 to be recycled to generator 31.

In the examples of FIG. 2 power transmitting device 34 driven by fluid responsive engine 32 drives auxiliary equpiment necessary for the operation of the heater. Such auxiliary equipment can include a combustion air blower 45 to provide combustion air to working fluid generator 31, a fan 37 to move the air stream to be heated through condenser 33, and a motive fluid feed pump 38 which pumps working fluid from receiver 39 to generator 31 for revaporization of the motive fluid.

Fuel to be burned in fluid generator 31 can be provided by means of a pump 41 also driven by power transmitting means 34 where the fuel is delivered from a source (not shown). A fuel control valve 42 can be provided to be operated in response to selected conditions, for example the temperature of the air emitted from condenser 33 as measured by thermal element 43. The rate at which fuel is provided to working fluid generator 31 determines the rate of vaporization of working fluid and therefore the quantity of heat provided to condenser 33.

Working fluid emitted from engine 32 is passed to condenser 33 which also receives an air stream in heat exchange relation. Working fluid flows from condenser 33 to receiver 39.

In accordance with one feature of the present invention a noncondensable gas chamber 48 is provided and is connected to the upper portion of receiver 39 by means of conduit 49 including valve 51. Chamber 48 is charged with superatmospheric noncondensable gas in a manner similar to the method described for charging chamber 12 of the apparatus of FIG. 1.

The operation of the apparatus in accordance with the example of FIG. 2 is in some respects similar to the operation of the refrigeration circuit of FIG. 1 in that the vapor pressure of the working fluid in the circuit determines the amount of noncondensable gas admitted to the circuit. An increase in the vapor pressure of the working fluid in response to an increase in the temperature of the working fluid causes more noncondensable gas to migrate to chamber 48. On the contrary a decrease in working fluid temperature accompanied by a decrease in working fluid vapor pressure increases the amount of noncondensable gas in the system and the condenser to decrease the effective condensing area and the rate of heat loss to the air stream passing through condenser 33. It is to be noted that the vapor pressure of the working fluid in condenser 33 is a direct function of the amount of heat added to the working fluid in generator 31. In the example of FIG. 2, as the temperature of the air stream is decreased below the desired value the fuel feed rate is increased to increase the quantity of working fluid vaporized so the pressure of the working fluid in condenser 33 is increased to drive more of the noncondensable gas into chamber 48 and increase the effective heat transfer area to increase the temperature of the air stream. Conversely, as the temperature of the air stream is increased above the desired value the fuel feed rate is decreased to decrease the rate of vaporization of working fluid so the pressure at the outlet of condenser 31 is decreased and noncondensable gas blocks a portion of the condenser to decrease the effective heat transfer area.

The invention claimed is:

1. In a heat exchange method wherein a vaporizable condensable working fluid is circulated through a cooperatively interconnected fluid flow circuit including a vaporized means and a condenser means, and wherein a portion of the fluid is vaporized in said vaporizer means part of the circuit, and the fluid including said vaporized portion is condensed in said condenser means part of the circuit, an improved method for controlling operation of the circuit including: providing a storage source of a selected relatively noncondensable gas, of relative volatility substantially greater than the volatility of said working fluid in uninterrupted communication with said circuit during circuit operations to introduce said noncondensable gas by migration into the circuit in response to a selected decrease in vapor pressure of said working fluid circulated through said circuit to maintain a superatmospheric total pressure in said circuit at selected temperature, which total pressure is in excess of the vapor pressure of said working fluid at said selected temperature; and, removing by migration from said circuit to said storage source a portion of said gas from said circuit in response to an increase in vapor pressure of said working fluid.

2. The method of claim 1 including passing a cooling medium to be heated through said condenser means to remove heat from said working fluid.

3. The method of claim 1 including introducing by migration a portion of said noncendensable gas to said condenser means in response to a decrease in vapor pressure of said working fluid to exclude said working fluid from a portion of said condenser means and decrease the heat exchange capacity of said condenser means.

4. The method of claim 1 including collecting condensed working fluid emitted from said condenser means in a receiving means disposed in said circuit downstream of said condenser means and introducing said noncondensable gas to said receiver means so said noncondensable gas can exert pressure above said condensed refrigerant collected in said receiver means and said relatively noncondensable gas can migrate upstream in said circuit from said receiver means to said condenser means in response to a decrease in vapor pressure of said working fluid in said receiver means to exclude said working fluid from a portion of said condenser means to decrease the heat exchange capacity of said condenser means.

5. The method of claim 1 including removing said gas by migration from the top of said condenser means and returning said relatively noncondensable gas by migration to said gas storage means in response to increase in vapor pressure of said working fluid.

6. A heat exchange arrangement wherein a vaporizable-condensable working fluid is circulated through a cooperatively interconnected circuit including: heat and pump means to pump and heat working fluid to vaporize said working fluid, condenser means to receive said vaporized working fluid from said heat and pump means to condense a portion of said vaporized working fluid; gas supply means to store a selected volume of relatively noncondensable gas to relative volatility substantially greater than the volatility of said working fluid; means to cooperatively, communicatively and uninterruptively connect said gas supply means into said system so noncondensable gas migrates into said system in response to decrease in vapor pressure of said working fluid to substantially maintain the total gas pressure within said circuit; and means to uninterruptively remove by migration noncondensable gas from said circuit in response to increase in equilibrium vapor pressure of said working fluid and return said noncondensable gas by migration to said gas supply means.

7. The apparatus of claim 6 including receiver means disposed in said circuit downstream of said condenser means to receive condensed working fluid from said condenser means wherein said relatively noncondensable gas supply means is connected into said receiver means; and, means to permit noncondensable gas to migrate from said receiver means to said condenser means to exclude vaporized working fluid from a portion of said condenser means in response to decreased vapor pressure of refrigerant collected in said receiver means.

8. A fluid heater arrangement where a vaporizable-condensable working fluid is circulated through a heat exchange circuit including heat source means to vaporize the working fluid, fluid responsive means to receive vaporized working fluid to provide motive power to selected auxiliary elements for supplying service to said heater, condenser means to receive working fluid emitted from said fluid responsive engine and means to pass a stream of fluid to be heated through said condenser means in heat exchange relation, the present invention provides an improved control arrangement including: gas supply means to hold a selected quantity of compressed gas at superatmospheric pressure where the equilibrium vapor pressure of said gas at selected temperature is substantially greater than the vapor pressure of said working fluid at said temperature; means to supply said gas to said circuit in response to decreased refrigerant vapor pressure in said condenser to maintain a superatmospheric pressure in said circuit; and, means to remove a portion of said gas from said circuit in response to increase in vapor pressure of said refrigerant in said condenser means.

9. The apparatus of claim 8 including condensed working fluid receiver means disposed in said circuit downstream of said condenser means wherein said gas is introduced to said receiver means to flow upstream in said circuit from said receiver means to said condenser means to exclude working fluid from a portion of said condenser means to reduce the heat exchange capacity of said condenser means.

References Cited

UNITED STATES PATENTS

| | | | |
|---|---|---|---|
| 2,961,476 | 11/1960 | Maslin et al. | 165—105 |
| 3,371,298 | 2/1968 | Narbut | 165—105 |

ROBERT A. O'LEARY, Primary Examiner

C. SUKALO, Assistant Examiner

U.S. Cl. X.R.

165—105